(12) United States Patent
Feight

(10) Patent No.: US 7,719,436 B2
(45) Date of Patent: *May 18, 2010

(54) SYSTEM, A TOOL AND A METHOD FOR COMMUNICATING WITH A FAULTED CIRCUIT INDICATOR USING A DISPLAY

(75) Inventor: Laurence V. Feight, Island Lake, IL (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 40 days.

This patent is subject to a terminal disclaimer.

(21) Appl. No.: 12/131,819

(22) Filed: Jun. 2, 2008

(65) Prior Publication Data

US 2008/0231463 A1 Sep. 25, 2008

Related U.S. Application Data

(63) Continuation-in-part of application No. 11/253,423, filed on Oct. 19, 2005, now Pat. No. 7,382,272.

(51) Int. Cl.
  *G08B 5/22* (2006.01)
  *G08B 21/00* (2006.01)
  *G05B 23/02* (2006.01)
  *H04B 10/00* (2006.01)

(52) U.S. Cl. ............................. 340/815.45; 340/815.47; 340/815.5; 340/555; 340/825.72; 340/638; 340/650; 340/3.43; 361/641; 398/106; 398/109; 324/500

(58) Field of Classification Search ............. 340/815.45
See application file for complete search history.

(56) References Cited

U.S. PATENT DOCUMENTS

| | | | |
|---|---|---|---|
| 4,456,873 A | 6/1984 | Schweitzer |
| 4,751,605 A | 6/1988 | Mertz |
| 5,008,651 A | 4/1991 | Schweitzer |
| 5,345,230 A | 9/1994 | Jackson |
| 5,680,052 A | 10/1997 | Tomari |
| 5,943,201 A | 8/1999 | Walker |
| 5,959,537 A | 9/1999 | Banting |
| 6,016,105 A | 1/2000 | Schweitzer |
| 6,133,723 A | 10/2000 | Feight |
| 6,133,724 A | 10/2000 | Schweitzer |

(Continued)

FOREIGN PATENT DOCUMENTS

GB 2381875 5/2003

*Primary Examiner*—Donnie L Crosland
(74) *Attorney, Agent, or Firm*—Richard M. Edge

(57) ABSTRACT

Provided is a system, a tool and a method for communicating with a faulted circuit indicator (FCI), the faulted circuit indicator including a detection circuit for monitoring an electrical conductor of a power system. The system includes a display and a first light emitting diode associated with the display. The first light emitting diode generates an optical FCI status signal in response to an occurrence of a fault in the electrical conductor. The system also includes a first microcontroller operatively coupled to the display and the detection circuit, and a handheld user command tool adapted to optically couple with the display. The handheld user command tool is also adapted to generate an optical serial communication. The optical serial communication provides data and commands for operation of the faulted circuit indicator. The display may be remote or integrated into the FCI.

31 Claims, 8 Drawing Sheets

U.S. PATENT DOCUMENTS

| | | |
|---|---|---|
| 6,433,698 B1 | 8/2002 | Schweitzer |
| 6,449,741 B1 | 9/2002 | Organ |
| 6,479,981 B2 | 11/2002 | Schweitzer |
| 6,675,339 B1 | 1/2004 | Lanier |
| 6,734,662 B1 | 5/2004 | Fenske |
| 6,822,576 B1 | 11/2004 | Feight |
| 6,894,478 B1 | 5/2005 | Fenske |
| 7,023,691 B1 | 4/2006 | Feight |
| 7,239,810 B2 * | 7/2007 | Seely et al. .......... 398/109 |
| 7,382,272 B2 * | 6/2008 | Feight ............ 340/815.4 |
| 7,570,470 B2 * | 8/2009 | Holley ................ 361/64 |
| 2002/0149822 A1 | 10/2002 | Stroud |
| 2003/0058097 A1 | 3/2003 | Saltzstein |
| 2003/0167345 A1 | 9/2003 | Knight |
| 2003/0170033 A1 | 9/2003 | Peterson |
| 2003/0214391 A1 | 11/2003 | Kondo |

\* cited by examiner

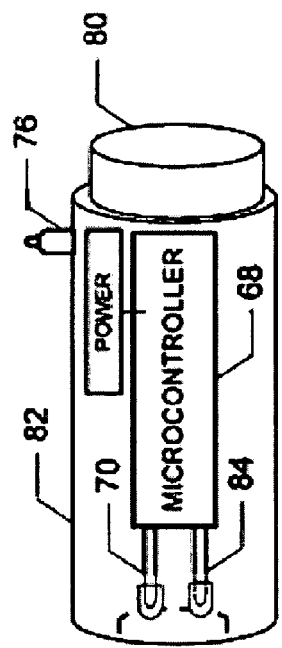
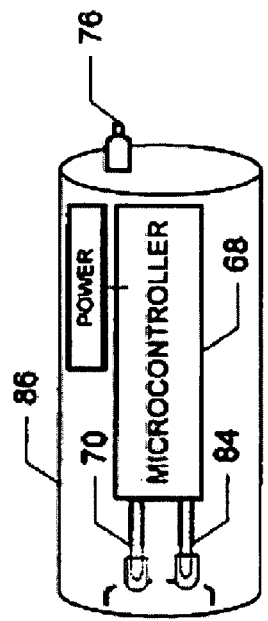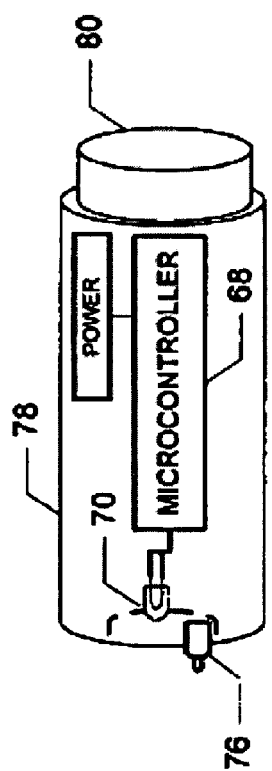
FIG. 3
FIG. 4
FIG. 5

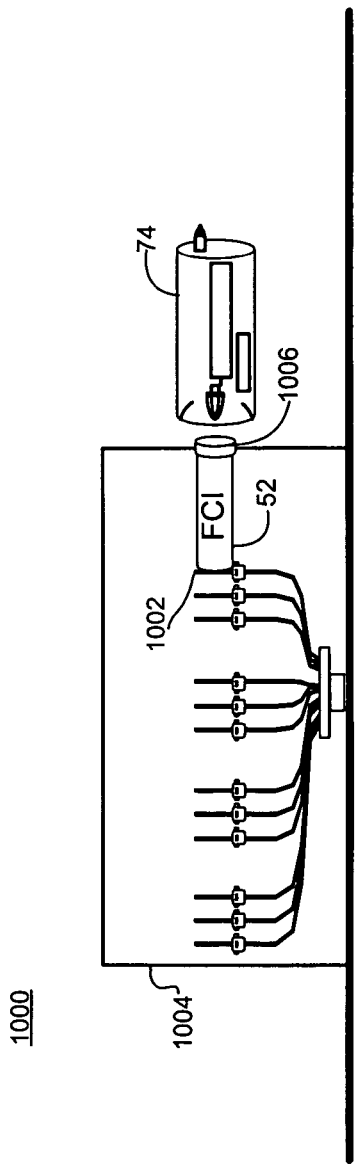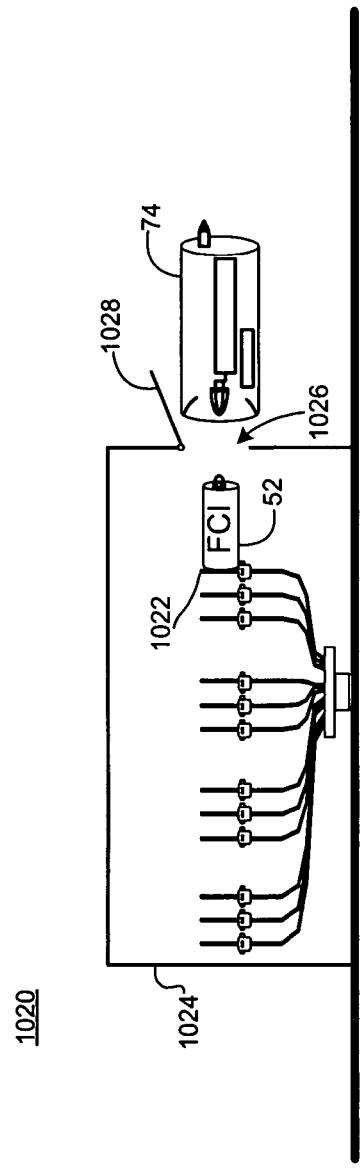
FIG. 10A
FIG. 10B

SYSTEM, A TOOL AND A METHOD FOR COMMUNICATING WITH A FAULTED CIRCUIT INDICATOR USING A DISPLAY

RELATED APPLICATIONS

This application is a Continuation-in-part of U.S. patent application Ser. No. 11/253,423, filed on 19 Oct. 2005, now U.S. Pat. No. 7,382,272 titled A System, a Tool, and a Method for Communicating with a Faulted Circuit Indicator Using a Remote Display, naming Laurence V. Feight as inventor, hereby incorporated by reference in its entirety.

BACKGROUND

1. Field of the Invention

The disclosure relates generally to the monitoring, servicing, and maintaining of electrical power lines and more specifically to a system, a tool and a method for communicating with a faulted circuit indicator using a display.

2. Description of Related Art

Faulted Circuit Indicators (FCIs) indicate the occurrence of a fault current in a monitored electrical conductor such as a transmission line. An FCI typically includes a housing and a number of FCI elements. The FCI elements may include a power supply such as a battery, a "remote" display for indicating when a fault in a monitored electrical conductor has occurred, a detection circuit such as a reed switch or split-core current transformer for sensing the current in the monitored electrical conductor and for providing a signal that is related to the current in the monitored conductor, and an FCI microcontroller for controlling operation of the FCI. In some cases however, the FCI may not include an FCI microcontroller. The FCI may include a display as an integral part of the FCI for indicating when a fault in a monitored electrical conductor has occurred. FCIs with integral displays may be used on overhead power lines as well as on underground power lines.

Various types of self-powered FCIs have been constructed for detecting electrical faults in electrical conductors and the like. For example, a clamp-on type FCI clamps directly over an electrical conductor and derives its operating power from inductive and/or capacitive coupling to the monitored electrical conductor. A test point type FCIs is mounted over a test point on an electrical conductor of the power system and derives its operating power from capacitive coupling to the monitored electrical conductor. For underground electrical conductors, FCIs are generally used at padmounted distribution transformers, subsurface load centers or junction sectionalizing points (e.g., one section of an electrical conductor mates with a connector that distributes power to multiple electrical conductors). For overhead electrical conductors, FCIs are generally used at main line feeders or mid-feeder disconnects.

An FCI monitoring the status of an associated electrical conductor is at times housed in a weather-proof enclosure, either pole-mounted for overhead electrical conductors or surface-level padmounted for underground electrical conductors. Typically, the remote display (or translucent window operatively coupled to the remote display) is strategically mounted on an outside wall of the enclosure to enable easy viewing by utility personnel. Alternatively, the FCI may be strategically placed and include an integral display for easy viewing by utility personnel. Accordingly, when the enclosure is opened, utility personnel are able to access the FCI(s) and associated sections of the electrical conductor housed in the enclosure. When the enclosure is closed, the FCI(s) and associated electrical conductor sections are protected from external environmental conditions while only allowing utility personnel to view a fault condition from outside the enclosure via the remote display.

During operation of a microcontroller-based FCI, the FCI microcontroller receives the monitored current signal from the detection circuit and, based on that monitored current signal, determines the current in the electrical conductor. If the current exceeds a trip threshold setting value of the FCI, the FCI microcontroller determines that a fault condition has occurred and causes a fault condition signal to be provided to utility personnel via the remote display.

As noted above, placement of the remote display on an outside wall of the enclosure reduces the need for specially trained utility personnel to access the interior of the padmounted or the pole-mounted enclosure to determine electrical conductor status. Likewise, strategic placement of an FCI with an integral display may yield similar benefits. Such a remote or integral display may incorporate one of any number of suitable display technologies to provide an indication of electrical conductor status to the utility personnel. For example, the remote or integral display may incorporate a mechanical target (indicator), a magnetic element, a flashing light emitting diode (LED), or a combination of technologies to display electrical conductor status to utility personnel located outside of the enclosure.

Some FCIs are designed to automatically reset at the end of a predetermined time period (e.g., eight hours) that begins when a fault condition is detected in the monitored electrical conductor. During that predetermined time period however, demand on the FCI power supply increases to enable the operation of the display. As a result, manual resetting of the FCI prior to expiration of the predetermined time period is often desirable. In addition to resetting the display, manual resetting provides an indication to the FCI microcontroller to cause it to terminate a timer countdown associated with the predetermined time period (e.g., terminates the eight hour countdown during which time an LED flashes), and thus extends the life of the FCI power supply.

Testing and maintenance activities may be routinely executed on the FCI. Further, in some cases, the testing and maintenance activities may be mandated by a number of regulatory commissions. Obviously, the time and cost associated with FCI resetting, testing and maintenance activities can be reduced if they can be performed without requiring specially trained utility personnel to open the enclosures.

To reduce the costs associated with FCI resetting, testing and other maintenance activities, U.S. Pat. No. 6,894,478 ('478), issued May 17, 2005, to Fenske, entitled "Fault Indicator with Automatically Configured Trip Settings", discloses an FCI having a remote display configured as a "beacon bolt" mounted to an outside wall of an enclosure. The beacon bolt includes a reed switch and an LED housed in a bolt that requires a ⅝" remote display mounting hole in the enclosure wall. Illumination and non-illumination of the LED provides the visual indication of the status of the conductor monitored by the associated FCI. The reed switch enables set/reset and test activities to be performed by the utility personnel via a magnetic test tool. The utility industry however, is migrating to a smaller remote display mounting hole (e.g., ⁵⁄₁₆" or ⁷⁄₁₆") due to the increased ease of drilling the remote display mounting hole in the field.

BRIEF DESCRIPTION OF THE DRAWINGS

FIG. 3 is a diagram of an exemplary user command tool that may be used to communicate with the faulted circuit indicator of FIG. 2, according to an embodiment of the disclosure;

FIG. 4 is a diagram of another exemplary user command tool that may be used to communicate with the faulted circuit indicator of FIG. 2, according to an embodiment of the disclosure;

FIG. 5 is a diagram of yet another exemplary user command tool that may be used to communicate with the faulted circuit indicator of FIG. 2, according to an embodiment of the disclosure;

FIG. 10A illustrates a system for communicating with a faulted circuit indicator via an integral display; and, FIG. 10B illustrates a system for communicating with a faulted circuit indicator via an integral display.

DETAILED DESCRIPTION

Implementation of the system, the tool and the method disclosed herein enables utility personnel outside of an enclosure housing the FCI to transmit optical serial communications affecting FCI operation via a display. The display may be located within a display bolt mounted in an enclosure wall, thereby precluding a need to physically access the FCI located in the enclosure's interior. The display may be remote and located such that it would be visible to utility personnel, such as, mounted in a lens in a manhole cover, mounted below a manhole cover such that the active display could be viewed through a lens and that the display could sense the optical signals from the user command tool, or that an integral display unit could be mounted on a high voltage bus or mounted on a high voltage shielded cable within an enclosure and be within optical range of the user command tool through a clear window plate in the enclosure. Further, the display may be integral to the FCI, and located such that it is visible to utility personnel. For example, the display may be on a face of an FCI attached to an overhead conductor or an underground conductor, or other conductor visible to utility personnel. The display may be on a face of an FCI attached to a conductor housed in an enclosure or in an underground vault, where the enclosure includes access to the display through an aperture, a lens or the like. Unlike prior art remote displays having both a reed switch and an LED, and requiring a ⅝" display mounting hole, the remote display of the system and method disclosed herein includes only the LED and therefore requires a smaller remote display mounting hole.

In addition, a user command tool of the system and method disclosed herein is capable of transmitting optical serial data and optical serial commands (i.e., optical serial communications) to the FCI via the LED, resulting in more robust capability to reset, test and maintain the FCI. Although discussed in terms of underground power lines, or underground electrical conductors, the embodiments disclosed herein are applicable to a wide range of configurations including, for example, overhead power lines or mounted on high voltage bare buss work inside metal enclosures.

Figure 1:
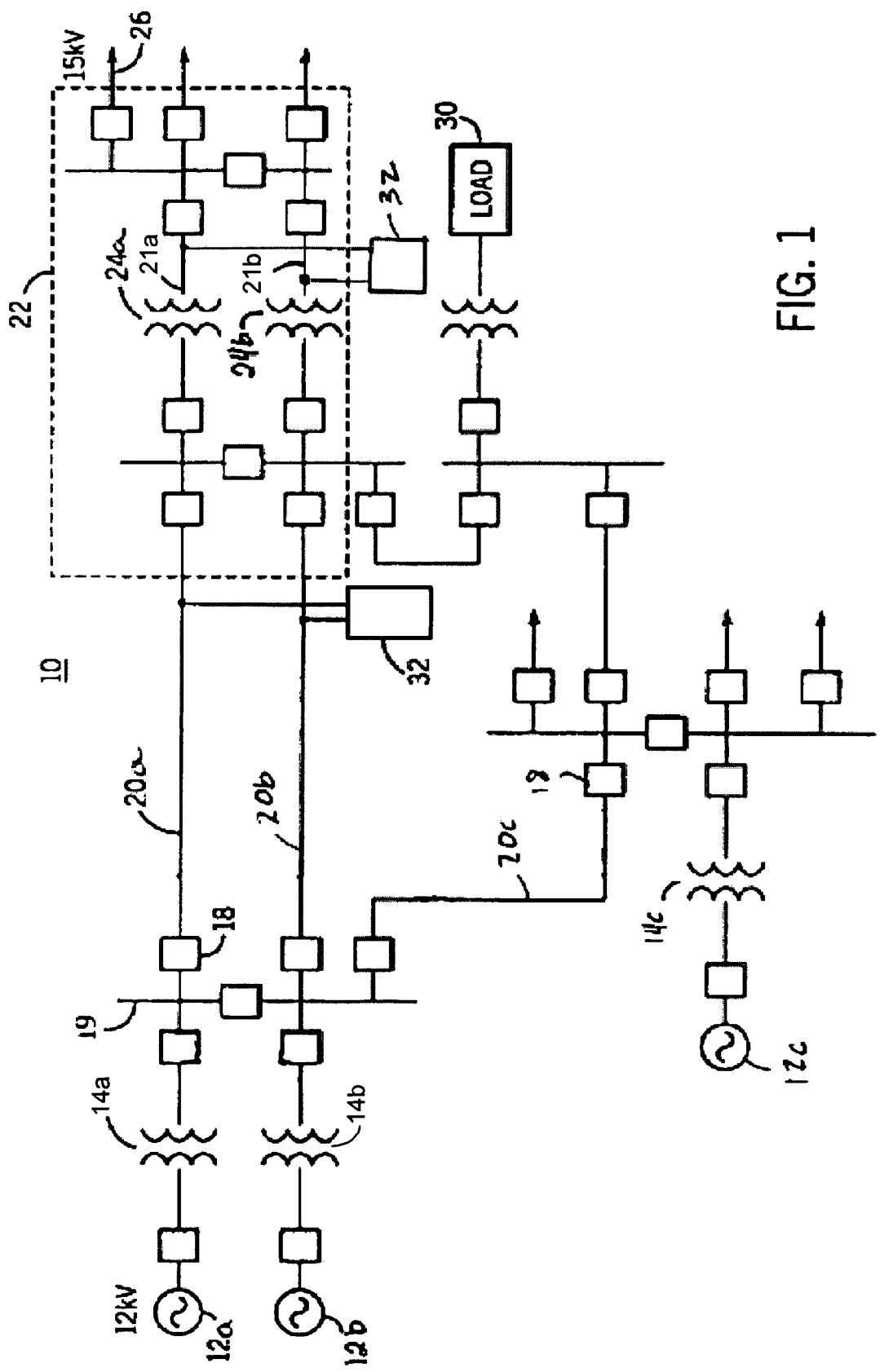
FIG. 1 is a schematic diagram of a power system that may be utilized in a typical metropolitan area.

FIG. 1 is a schematic diagram of a power system 10 that may be utilized in a typical metropolitan area. As illustrated in FIG. 1, the power system 10 includes, among other things, three generators 12a, 12b and 12c configured to generate three-phase sinusoidal waveforms, such as 12 kV sinusoidal waveforms. The power system 10 also includes three step-up power transformers 14a, 14b and 14c configured to increase the generated sinusoidal waveforms to a higher voltage such as 138 kV, a number of circuit breakers 18 and three transmission lines 20a, 20b and 20c interconnected via a first substation bus 19. At the end of the transmission lines 20a and 20b, a substation 22 includes two step-down power transformers 24a and 24b to transform the higher voltage sinusoidal waveforms to a lower voltage (e.g., 15 kV) suitable for distribution to various end users 26 (and loads 30).

The power system 10 also includes a number of padmounted enclosures 32 located at various points along underground distribution lines, for example, along underground distribution lines 21a and 21b to enable fault monitoring of an associated segment of the underground distribution line. The pad mounted enclosures are typically located at the end of one segment and the beginning of another segment of an underground distribution line. Accordingly, one or more FCIs are located in the padmounted enclosure 32 to assist the utility personnel in determining which segment in the distribution line needs servicing when a fault occurs.

Figure 2:
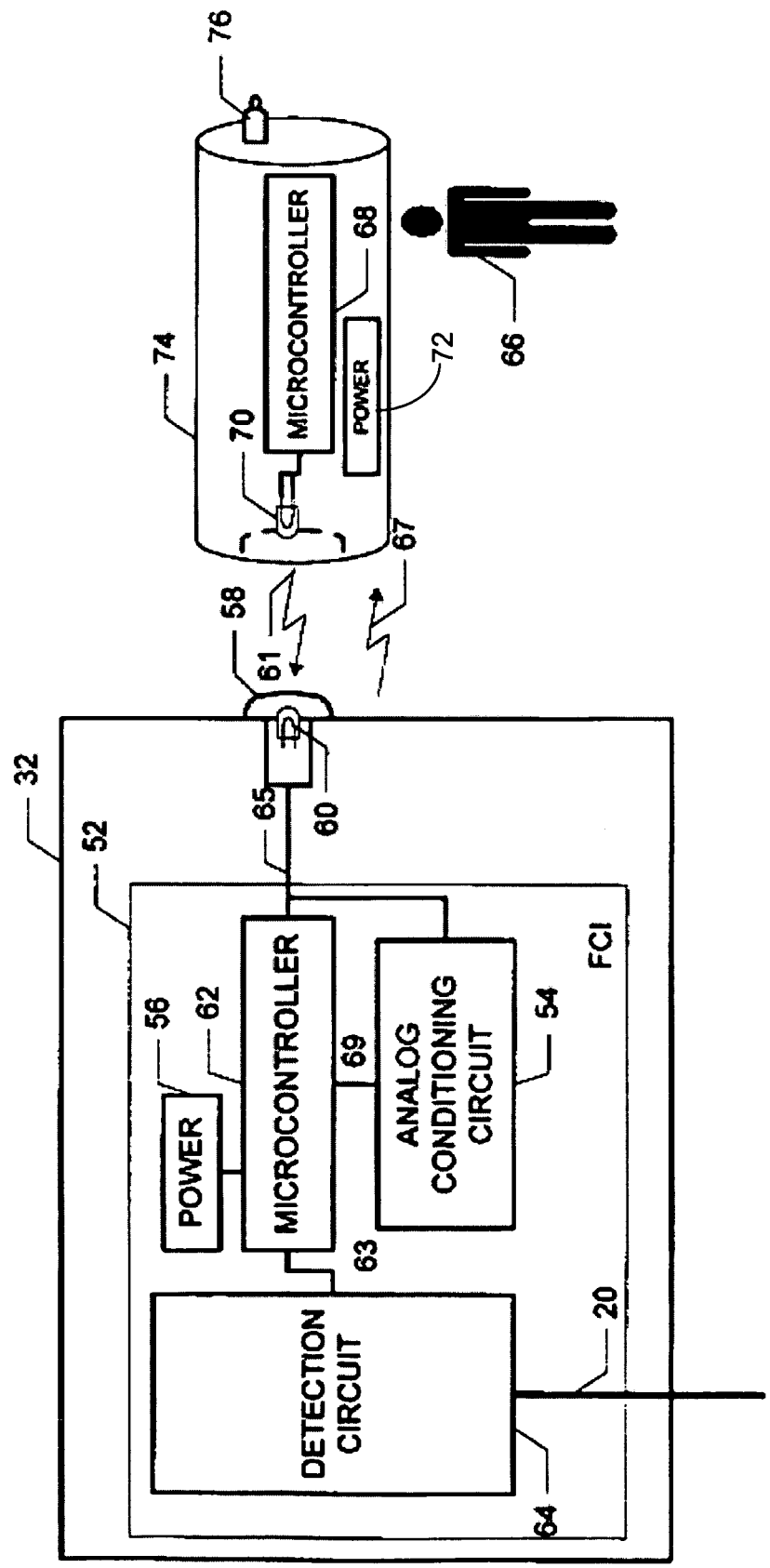
FIG. 2 is an exemplary system for communicating with a faulted circuit indicator located in an enclosure via a remote display, according to an embodiment of the disclosure.

FIG. 2 is an exemplary system 50 for communicating with a faulted circuit indicator 52 located in an enclosure via a remote display, according to an embodiment of the disclosure. As illustrated, the system 50 includes the enclosure 32 housing the FCI 52, an analog conditioning circuit 54, a power supply 56 and remote display bolt 58 including a first LED 60, all operatively coupled to an FCI microcontroller 62.

The remote display bolt 58 is preferably a bolt designed to fit into a smaller diameter hole, such as a ⁵⁄₁₆" hole, in a suitable wall of the enclosure 32. Construction of the remote display bolt 58 may include the use of a metal injection molded stainless steel core with a polycarbonate overmold designed to improve shear force tolerance of the remote display bolt 58 housing and to allow use of standard sealing washers for corrosion prevention.

The FCI 52 further includes a detection circuit 64 such as a split core current transformer, operatively coupled to the FCI microcontroller 62 and strategically located to monitor a segment of an electrical conductor such as a segment of a distribution line of the power system 10. Although the FCI elements such as the analog conditioning circuit 54, the power supply 56 and the detection circuit may be included in the FCI 52, it is contemplated that the detection circuit may be included in the FCI 52 while the remaining FCI elements may be included in a separate external box. In yet another configuration, the detection circuit may be included in the FCI 52 while the remaining FCI elements, except the remote display, may be included in a separate external box.

During typical FCI operation, the first microcontroller 62 receives monitored current signals 63, indicative of currents in the monitored electrical conductors, from the detection circuit 64. When a fault condition is detected (e.g., monitored current signal exceeds a threshold), the FCI microcontroller 62 causes an indication of the fault (i.e., an optical FCI status)

to be displayed via the first LED 60. The FCI microcontroller 62 also sends commands to the detection circuit 64. In the illustrated example, copper wire is used to enable transmission between the FCI microcontroller 62 and the detection circuit 64; however other suitable transmission media may be utilized. Similarly, communication between the FCI microcontroller 62 and the first LED 60 is enabled using copper wire; however other suitable transmission media may be utilized. Although only one FCI 52 is included in the enclosure 32, it is contemplated that additional FCIs, configured and operational as the FCI 52, may also be included.

As mentioned above, the FCI 52 generally requires FCI resetting, testing and other maintenance activities to be performed by utility personnel 66. Referring again to FIG. 2, a user command tool 74 is also included in the system 50 to enable an optical serial communication 61 to be provide to the FCI 52 via the first LED 60 while the utility personnel 66, holding the user command tool 74, is located outside of the enclosure 32. Such an optical serial communication 61 may include, for example, data or a command, in the form of a pattern such as a repetitive serial pattern, useable by the FCI microcontroller 62 to perform FCI resetting, testing and other maintenance activities.

In an embodiment, the FCI microcontroller 62 includes a Texas Instruments MSP430 microprocessor operatively coupled to a suitable memory means of the FCI microcontroller 62. As will be appreciated by one skilled in the art, other types of FCI microprocessors may be used. For reasons discussed below, the microprocessor is preferably configured to remain in a sleep-mode, or low-power mode, until it receives an indication of the optical serial communication 61 or until it is called upon to perform a task (e.g., cause the first LED 60 to flash). For example, if the microprocessor is used in conjunction with a low-power crystal oscillator, a serial port of the microprocessor can receive an incoming serial digital signal representative of the optical serial communication 61 while in the sleep-mode. Upon receipt of the optical serial communication 61 signal however, a microprocessor-interrupt signal will activate to enable the optical serial communication 61 to be interpreted. Error detection and software control of the microprocessor-interrupt signal is also preferably included.

As illustrated in FIG. 2, the user command tool 74 includes a tool microcontroller 68 operatively coupled to a second LED 70 and a power supply 72. Although not separately shown, the tool microcontroller 68 includes a microprocessor and a memory operatively coupled to the microprocessor of the tool microcontroller 68. In an embodiment, the user command tool 74 also includes an on/off means 76 configured to enable the utility personnel 66 to initiate or terminate operation of the user command tool 74. Accordingly, the on/off means 76 may be one of a binary test switch, a push button, a membrane switch, a switch actuator, to name a few.

In order to provide an accurate optical serial communication 61 to the LED 70, a tight physical connection is preferred between the user command tool 74 and the remote display bolt 58. This tight physical connection minimizes a possibility of ambient light reaching the first LED 60, and may be accomplished in one of any number of ways. For example, a transmitting end of the user command tool 74 may be configured in a concave manner to enable substantially precise mating with the convex shape of the remote display bolt 58. A description of optical communication is also found in U.S. patent application Ser. No. 11/750,917 (US Patent Application Publication No, 2007/0269219), hereby incorporated by reference.

The user command tool 74 may be configured in one of any number of suitable configurations. For example, placement of the on/off means 76 may vary, depending on the preferred design of the user command tool 74. In an embodiment, the on/off means 76 may be a switch actuator located at the transmitting end of the user command tool 74 such that when the user command tool 74 is coupled to the remote display bolt 58, the switch actuator will automatically depress to enable transmission of the optical serial communication 61.

FIG. 3 is a diagram of an exemplary user command tool 78 that may be used to communicate with the FCI 52, according to an embodiment of the disclosure. As illustrated in FIG. 3, it includes the on/off means 76 disposed in the transmitting end, and a connector 80 configured to communicate with an intelligent computing device such as a laptop computer. The connector 80 may be configured as a serial port, a universal serial bus, or an RF transceiver arrangement such as a Bluetooth transceiver, to name a few.

When connected to the intelligent computing device, the user command tool 78 may be programmed to reconfigure the operational parameters of the FCI 52 such as, for example, a display time-out duration parameter and/or a fault level threshold parameter. The user command tool 78 may also be programmed to activate or deactivate operation features of the FCI 52 such as activation/deactivation of inrush restraint functionality or activation/deactivation of timed reset functionality.

FIG. 4 is a diagram of another exemplary user command tool 82 that may be used to communicate with the FCI 52, according to an embodiment of the disclosure. As illustrated in FIG. 4, a photosensor 84 is operatively coupled to the tool microcontroller 68, and configured to receive optical FCI status signals 67 from the FCI 52 via the first LED 60 (see, FIG. 2). Accordingly, when received by the photosensor 84, the optical FCI status signal 67 is utilized by the tool microcontroller 68 to, for example, receive data from the FCI 52 and/or to implement a serial communications protocol such as Xmodem. Subsequent transmission of the optical serial communication 61 from the user command tool 82 to the FCI 52 is then accomplished via the second LED 70. The connector 80 is also included to enable communication with an intelligent computing device.

FIG. 5 is a diagram of yet another exemplary user command tool 86 that may be used to communicate with the FCI 52, according to an embodiment of the disclosure. The user command tool 86 includes the second LED 70 configured to provide the optical serial communication 61, the photosensor 84 configured to receive the optical FCI status signals 67, and the on/off means 76, all operatively coupled to the tool microcontroller 68. Although not separately illustrated, any of the user command tools described above may include a charger adaptor to enable recharging of its power supply.

Figure 6:
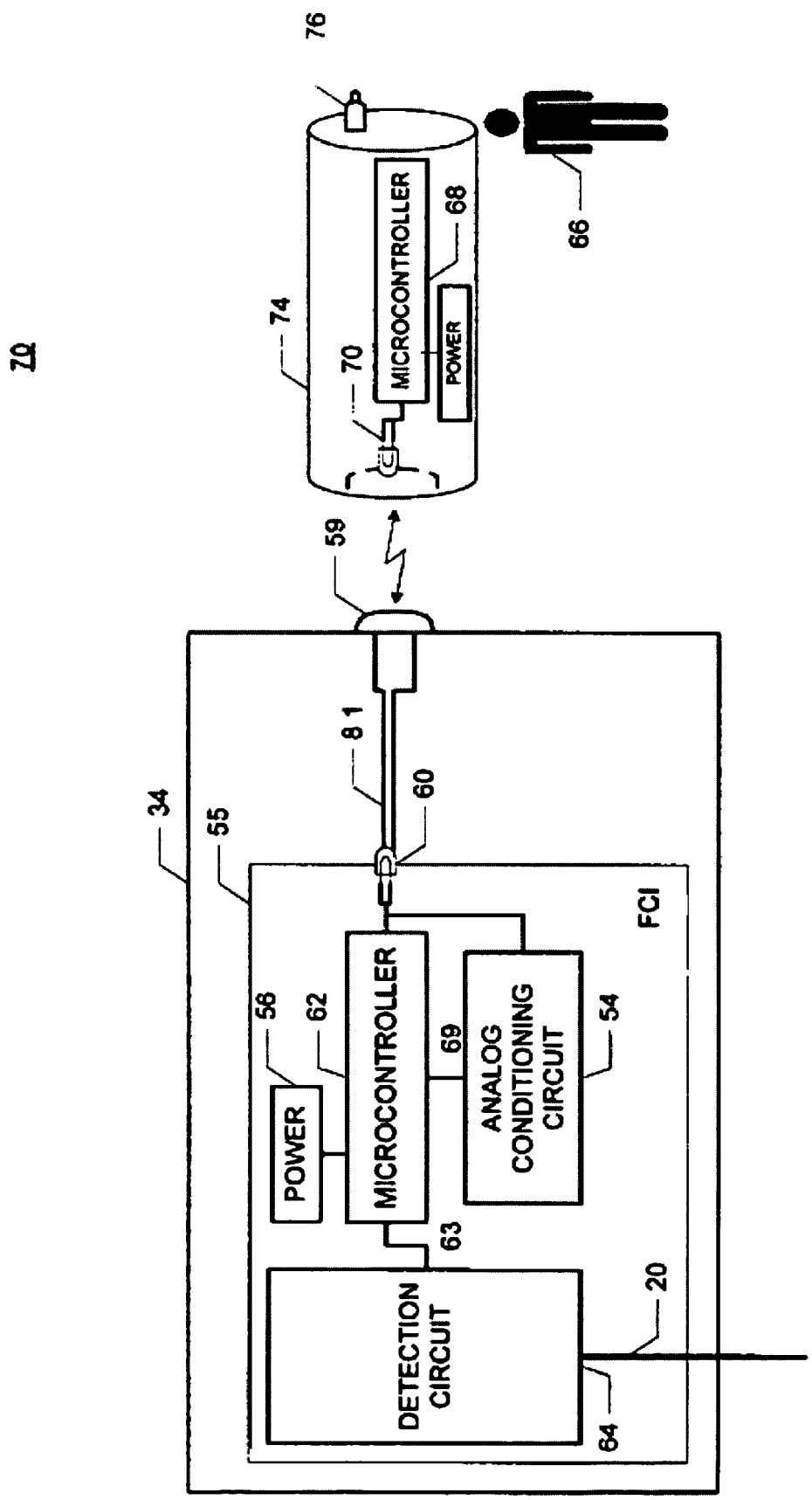
FIG. 6 is another exemplary system for communicating with a faulted circuit indicator located in an enclosure via a remote display, according to another embodiment of the disclosure.

As noted above, the elements of the FCI may be arranged in a number of ways. For example, FIG. 6 is another exemplary system 70 for communicating with the FCI via a remote display, according to another embodiment of the disclosure. Unlike the system 50 of FIG. 2, the system 70 of FIG. 6 utilizes a translucent remote display bolt 59 optically coupled to the first LED 60 via a fiber optic link 81. As illustrated, the first LED 60 is directly coupled to the FCI microcontroller 62. Like the remote display bolt 58, the translucent remote display bolt 59 is preferably a bolt designed to fit into a smaller diameter hole (e.g., a 7/16" hole) in a suitable wall of the enclosure 34. Construction of the translucent remote display bolt 59 may also include the use of a metal injection molded stainless steel core with a translucent cover and a polycarbonate overmold.

During operation, the translucent remote display bolt 59 enables indirect transmission of the optical serial communication 61 from the user command tool 74 to the first LED 60. Similarly, the translucent remote display bolt 59 enables indirect transmission of the optical FCI status signal 67 to the second LED 70 (or photosensor 84) of the user command tool 74.

Referring again to FIG. 2, during FCI resetting, testing and other maintenance activities, the user command tool 74 is tightly optically coupled to the remote display bolt 58. The optical serial communication 61 is transmitted via the second LED 70 from the user command tool 74 to the first LED 60. In addition to providing test activation and reset functionality, the user command tool 74 may be adapted to perform many activities. For example, the optical serial communication 61 may be a repetitive optical serial communication which, when converted into the serial digital signal 69 and received by the FCI microcontroller 62, provides operational instructions for the FCI 52. Such operational instructions may configure FCI features such as inrush restraint on/off, timed reset of LED on/off, and delay trip settings (e.g., 1, 8, 16, 24, or 48 milliseconds), to name a few. The operational instructions may also cause the FCI 52 to record selected data, transferable to an intelligent computing device via a suitably configured connector of the user command tool 74 (see, FIGS. 3 and 4). The optical serial communication 61 may also provide data to the FCI 52 such as time and date for accurate data logging.

Upon receipt by the first LED 60, the optical serial communication 61 is converted into a corresponding serial voltage signal 65, which is subsequently received by the analog conditioning circuit 54 and conditioned to form the serial digital signal 69 suitable for use by the FCI microcontroller 62. The analog conditioning circuit 54 includes circuitry to generate the serial digital signal 69, representative of the optical serial communication 61.

In general, when received, the serial digital signal 69 may cause the first microcontroller 62 to exit sleep-mode and execute an instruction such a test-activate instruction for testing FCI power supply status, or a reset instruction for terminating an LED illumination sequence for fault display. During the LED flash pattern indicating a fault condition (e.g., trip mode) the FCI microcontroller 62 repeatedly transitions between a sleep-mode and an active-mode; that is the microcontroller 62 transition from sleep-mode to active-mode to cause an LED flash, and then transitions back to sleep-mode during an inactive period between the LED flashes. During the inactive period of the LED flash pattern, the microcontroller 62 can again transition to active-mode to receive the serial digital signal 69; otherwise, the microcontroller 62 will receive the serial digital signal 69 without interruption. The selective interrupt capability allows the microcontroller 62 to stop execution of a command when a new instruction to do so is received. For example, if the microprocessor of the first microcontroller 62 is executing an instruction to repeatedly flash the first LED 60, this instruction to flash may be interrupted if another instruction is received to terminate flashing of the first LED 60.

Figure 7:
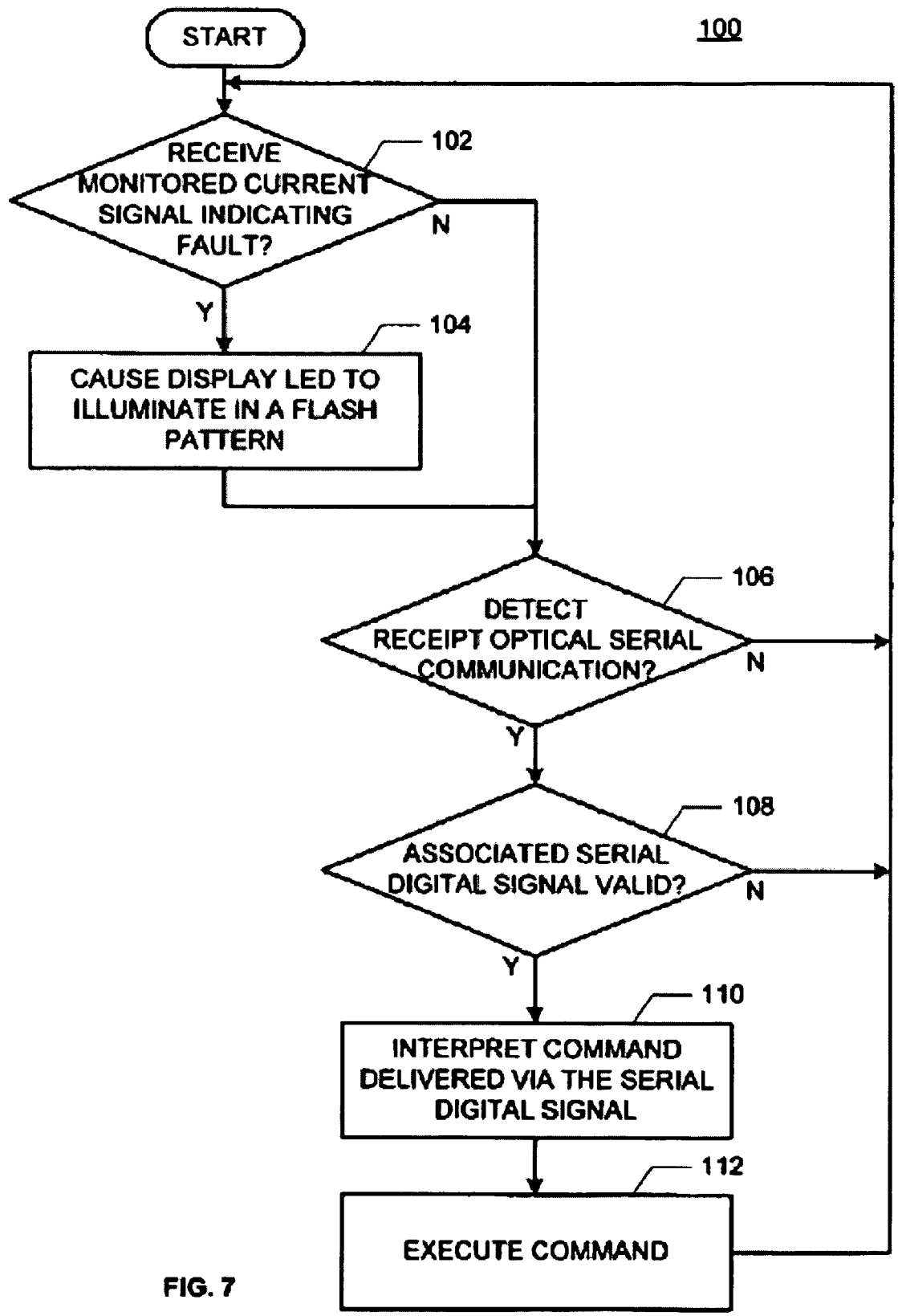
FIG. 7 is a flowchart of a method for communicating with a faulted circuit indicator via a remote display using the circuit assembly of FIG. 2, according to an embodiment of the disclosure.

FIG. 7 is a flow chart of a method 100 for communicating with an FCI via a remote display using a user command tool, according to an embodiment of the disclosure. Referring also to FIG. 2, the method 100 enables the utility personnel 66 with the user command tool 74 to communicate with the FCI 62 via the remote display 58. Referring to FIGS. 7 and 2, if a monitored current signal 63 from the detection circuit 64 indicates a trip condition, for example, a current in the monitored electrical conductor has exceeded a threshold value (step 102), the FCI microcontroller 62 causes the first LED 60 to illuminate in a flash pattern (step 104). The flash pattern may be steady or may be intermittent and generally continues for a predetermined time period such as, for example, eight hours to ensure that utility personnel 66 are aware of the trip condition. During the predetermined time period, illumination in a flash pattern of the first LED 60 requires power, albeit a "small" amount, from the power supply 56. Thus, it is advantageous for utility personnel 66, using the user command tool 74, to reset the FCI 52 as soon as possible and cancel out the remaining illumination time and conserve power usage.

When the first LED is not illuminating, upon detecting coupling of the user command tool 74 to the remote display 58 via the optical serial communication 61, the FCI microcontroller 62 transitions from the sleep-mode to the active-mode to enable receipt of the serial digital signal 69 representative of the optical serial communication 61 (step 106). In that case, the user command tool 74 may be used to determine if the power supply 56 is working, to change FCI settings such as trip time and LED illumination time, or to enable, disable or modify FCI parameters, to name a few.

When FCI microcontroller 62 detects receipt of the optical serial communication 61 from the user command tool 74 and the first LED 60 is flashing, during the inactive period of the LED flash pattern, the microcontroller 62 will transition to the active-mode to receive the serial digital signal 69 between flashes. In that case, the user command tool 74 may be used to cancel out the remaining illumination time of the first LED 60 and to enable the FCI 52 to respond to the detection circuit 64.

Referring again to FIG. 7, when the FCI microcontroller 62 detects receipt of the optical serial communication 61 from the user command tool 74, the associated serial digital signal 69 is "interrogated" by the microcontroller 62 for validity purposes in order to protect against inadvertently received signals such as ambient lights from a passing car. If the serial digital signal 69 is determined to be valid (step 108), the microcontroller 62 interprets the command delivered via the serial digital signal 69 (step 110) and will then act in response to the command delivered via the serial digital signal 69 (step 112).

Such commands may include, for example, a reset command and a test-activate command. As will be appreciated by one of ordinary skill in the art, validity of the serial digital signal 69 may be determined in one of any number of ways such as encoding the optical serial communication 61 using one of a variety of encoding methods.

As mentioned above, various FCIs include integral displays instead of or in addition to a remote display. Methods, apparatuses, and systems for communicating with FCIs via integral displays are further described herein.

Figure 8:
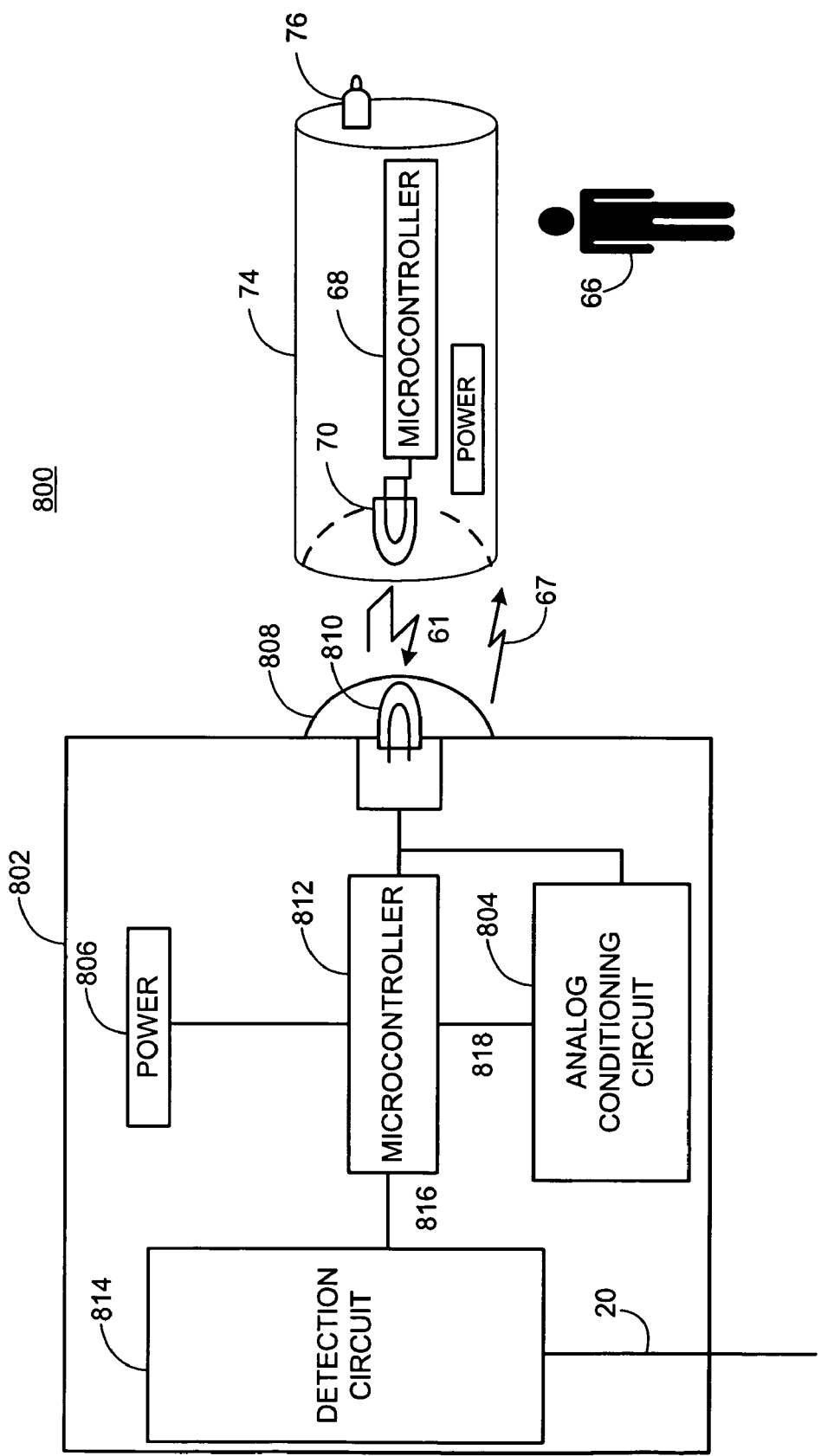
FIG. 8 is an exemplary system for communicating with a faulted circuit indicator via an integral display, according to an embodiment of the disclosure.

FIG. 8 illustrates an exemplary system 800 for communicating with an FCI 802 via an integral display, according to an embodiment of the disclosure. As illustrated, the system 800 includes an analog conditioning circuit 804, a power supply 806 and integral display 808 including a first LED 810, all operatively coupled to an FCI microcontroller 812.

The integral display 808 may be an integral part of the FCI 802. For example, the integral display 808 may be designed to provide an indication of the status of a monitored power conductor (not shown), such as, for example, a fault condition, a permanent fault condition, a temporary fault condition, an overcurrent condition, an undervoltage condition, a reset condition, and the like. As described in conjunction with the remote display, the integral display may include a flag (in which case, the display may include an LED solely for communication purposes as described herein), an LED or other visual indication of the status of the monitored power conductor. In an embodiment, the integral display may not be designed for indication of a status of a power conductor, but solely for the purpose of communication with the FCI. For example, the FCI may include an alternative method of communicating a status of the monitored power conductor such as, for example, via radio frequency.

The FCI 802 further includes a detection circuit 814 such as a split-core current transformer, operatively coupled to the FCI microcontroller 812 and strategically located to monitor a segment of an electrical conductor such as a segment of a distribution line 20 of the power system 10. Although the FCI elements such as the analog conditioning circuit 804, the power supply 806, and the detection circuit 814 may be included in the FCI 802, it is contemplated that the detection circuit 814 may be included in the FCI 802 while the remaining FCI elements may be included in a separate external box. In yet another configuration, the detection circuit may be include in the FCI 802 while the remaining FCI elements, except the integral display, may be included in a separate external box.

As described above with respect to the remote display, during typical FCI operation, the FCI microcontroller 812 receives monitored current signals 816, indicative of currents in the monitored electrical conductors, from the detection circuit 814. When a fault condition is detected (e.g. monitored current signal exceeds a threshold), the FCI microcontroller 812 causes an indication of the fault (i.e. an optical FCI status) to be displayed via the first LED 810. The FCI microcontroller 812 also sends commands to the detection circuit 814. In the illustrated example, copper wire is used to enable transmission between the FCI microcontroller 812 and the detection circuit 814; however, other suitable transmission media may be utilized. Similarly, communication between the FCI microcontroller 812 and the first LED 810 is enabled using copper wire; however other suitable transmission media may be used.

As mentioned above with the example of an FCI with a remote display, FCIs generally require resetting, testing and other maintenance activities to be performed by utility personnel 66. The user command tool 74 used in conjunction with the example of an FCI with a remote display may also be used for the example shown in FIG. 8 of an FCI with an integral display. The user command tool 74 is included in the system 800 to enable an optical serial communication 61 to be provided to the FCI 802 via the first LED 810 while the utility personnel 66, holding the user command tool 74, is located near the FCI 802. Such an optical serial communication 61 may include for example, data or a command, in the form of a pattern such as a repetitive serial pattern, useable by the FCI microcontroller 812 to perform FCI resetting, testing, and other maintenance activities.

In one embodiment, the FCI microcontroller is identical to the FCI microcontroller described in the example of an FCI with a remote display.

In one embodiment, the user command tool 74 is identical to the user command tool 74 described in the example of an FCI with a remote display.

In order to provide an accurate optical serial communication 61 to the LED 70, a physical connection is preferred between the user command tool 74 and the integral display 808, or a lens associated therewith. This physical connection minimizes a possibility of ambient light reaching the first LED 810, and may be accomplished in one of any number of ways. For example, a transmitting end of the user command tool 74 may be configured in a shape to enable substantially precise mating with the shape of the display 808 or a lens associated therewith.

As above, the user command tool 74 may be configured in one of any number of suitable configurations. For example, placement of the on/off means 76 may vary, depending on the preferred design of the user command tool 74. In an embodiment, the on/off means 76 may be a switch actuator located at the transmitting end of the user command tool 74 such that when the user command tool 74 is coupled to the integral display 808 or a lens associated therewith, the switch actuator will automatically depress to enable transmission of the optical serial communication 61.

The user command tool 74 may further be configured similar to those described above and illustrated in FIG. 3, 4, or 5.

Further, as described above, the user command tool 74 of this embodiment may be adapted to perform other activities such as, for example, the serial communication 61 may be a repetitive optical serial communication which, when converted into the serial digital signal 818 and received by the FCI microcontroller 812, provides operational instructions for the FCI 802, as described above. The optical serial communication 61 may also provide data to the FCI 812 such as time and date for accurate data logging.

The optical serial communication of this embodiment may be performed and cause similar responses among the similar modules of the FCI with an integral display as with the FCI with a remote display, as described above.

Further, the flow chart of a method 100 for communicating with an FCI via a remote display illustrated in FIG. 7 may be used for a method 100 for communicating with an FCI via an integral display.

Figure 9:
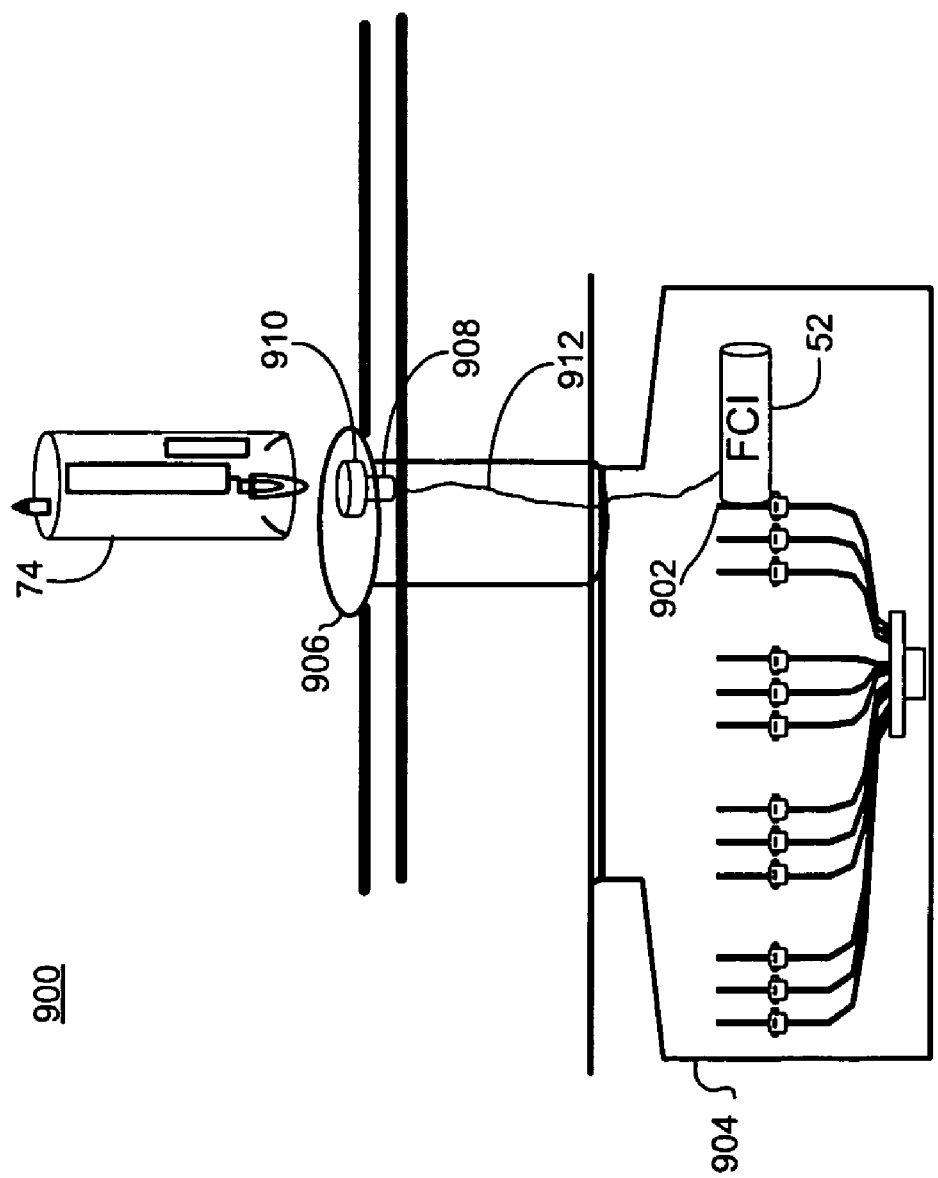
FIG. 9 is an exemplary system for communicating with a faulted circuit indicator via a remote display mounted in a manhole cover.

FIG. 9 illustrates a system 900 for communication with an FCI wherein the FCI 52 is in communication with a conductor 902 in a utility vault 904 (e.g., a manhole). The FCI 52 is in communication as described herein with a remote display 908 via connector 912 which may be copper, fiber optic, or the like, as described herein. The remote display 908 may be mounted in a cover for the vault, such as a manhole cover 906. The remote display 908 may be mounted in the cover 906 such that the handheld user command tool 75 may be placed in optical communication therewith. To that end, the remote display 908 may be mounted in an aperture of the cover 906. In one embodiment, the remote display 908 may be mounted below a cover 906 such that the active display could be viewed through the lens and that the display could sense the optical signals from the user command tool 74. Further, the cover 906 may include a lens 910, and the remote display 908 may be mounted thereto, thus allowing for optical communication between the remote display and the handheld user command tool 74. Thus, utility personnel 66 may communicate with the FCI 52 using the description herein via the remote display 908 attached to the cover 906.

While it has been illustrated that the FCI may be coupled to a conductor within a vault, the FCI may be coupled to a conductor where convenient. For example, an FCI with an integral display as described herein may be mounted on a bus (such as a high-voltage bus) in such a way that the integral display (such as the display 808 shown in FIG. 8) is positioned in such a way to be accessible to a user command tool 74 as described herein.

Further, as is illustrated in FIG. 10A, the FCI 52 with an integral display may be coupled to a conductor 1002 (such as a high-voltage shielded cable) or high-voltage bare buss or termination within an enclosure 1004 such as an aboveground enclosure. The enclosure 1004 may include a lens or aperture 1006 positioned such that the integral display of the FCI 52 is visually accessible to the user command tool 74 by way of the lens or aperture 1006.

FIG. 10B illustrates another embodiment wherein the FCI 52 is attached to a monitored unit 1022. The monitored unit 1022, though as shown is a conductor, may be a conductor, a high-voltage buss or termination, or other conductor. The monitored unit 1022 may be inside of a piece of switchgear 1024 with air insulation and clearances positioned to allow for visible access to the FCI 52 by the user command tool 74. As illustrated, the FCI 52 is visibly accessible to the user command tool 74 via an aperture 1026 (which may include a window, lens, void, or other medium through which the transmitted light may pass) that is covered at times by a removable barrier and/or a door 1028. The barrier and/or door 1028 may be closed unless access to the interior of the switchgear 1024 or FCI 52 is needed. The barrier 1028 may include a door and a protective barrier. The FCI 52 and user command tool 74 may perform communication via the aperture 1026 as described herein.

Though FIGS. 10A and 10B illustrates that the FCI 52 has in integral display, also disclosed is an FCI with a remote display housed in an above-ground enclosure with an aperture or lens. The remote display is mounted to the aperture or lens such that it is accessible via the handheld user command tool.

While this disclosure has been provided with reference to certain illustrative aspects, it will be understood that this description shall not be construed in a limiting sense. Rather, various changes and modifications can be made to the illustrative embodiments without departing from the true spirit, central characteristics and scope of the disclosure, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. A system for communicating with a faulted circuit indicator (FCI), the system comprising:
    a detection circuit housed in the FCI and configured to monitor an electrical conductor of a power system;
    a display;
    a fault status indicator associated with the display, the fault status indicator configured to generate an optical FCI status signal in response to an occurrence of a fault in the electrical conductor;
    a first microcontroller operatively coupled to the display and the detection circuit; and
    a handheld user command tool adapted to optically couple with the display and generate an optical serial communication, the optical serial communication providing data and commands for operation of the faulted circuit indicator.

2. The system of claim 1, further comprising an analog conditioning circuit operatively coupled to the display and the first microcontroller, the analog conditioning circuit configured to convert a serial voltage signal into a serial digital signal received by the first microcontroller, the serial voltage signal generated by the fault status indicator in response to receipt of the optical serial communication.

3. The system of claim 1, wherein the optical FCI status signal comprises a flashing illumination pattern.

4. The system of claim 1, wherein the fault status indicator comprises a first light emitting diode.

5. The system of claim 2, further comprising a first power supply operatively coupled to the first microcontroller, the display, the detection circuit and the analog conditioning circuit.

6. The system of claim 5, wherein the faulted circuit indicator includes the detection circuit, the first microcontroller, the analog conditioning circuit and the first power supply.

7. The system of claim 4, wherein the first light emitting diode is further adapted to provide the FCI optical status signal when the monitored current signal exceeds a trip threshold setting.

8. The system of claim 1, wherein the display comprises integral to the FCI.

9. The system of claim 1, wherein the display is remote from the FCI.

10. The system of claim 9, further comprising an underground vault including a cover, wherein the FCI is mounted in an underground vault, and the remote display is mounted to the cover.

11. The system of claim 10, wherein the cover comprises a lens, and the remote display is mounted to the lens.

12. The system of claim 1, wherein the handheld user command tool comprises:
    a housing having a first end adapted for optical coupling with the display;
    a second light emitting diode disposed at the first end of the housing;
    an on/off selector configured to enable and disable transmission of the optical serial communication;
    a second power supply operatively coupled to the second light emitting diode; and
    a second microcontroller operatively coupled to the second power supply, the second light emitting diode and the on/off selector, the second microcontroller configured to cause the second light emitting diode to generate the optical serial communication when an indication to enable transmission of the optical serial communication is received from the on/off selector.

13. The system of claim 12, wherein the housing comprises a cylinder, with an area is formed in the first end to enable the optical coupling with the display.

14. The system of claim 12, wherein the on/off selector comprises a binary switch disposed on an outside portion of the handheld user command tool, a first position of the binary switch enabling transmission of the optical serial communication and a second position of the binary switch preventing transmission of the optical serial communication.

15. The system of claim 14, wherein the handheld user command tool further comprises a connector, the connector enabling communication between an intelligent computing device and the second microcontroller.

16. The system of claim 15, wherein the connector is selected from the group consisting of a serial port, a parallel port and a universal serial bus connector.

17. The system of claim 12, wherein the handheld user command tool further comprises a transceiver assembly operatively coupled to the second microcontroller, the transceiver assembly enabling radio frequency communication between a radio frequency intelligent computing device and the second microcontroller.

18. The system of claim 12, wherein the handheld user command tool further comprises a photosensor disposed at the first end of the handheld user command tool and operatively coupled to the second microcontroller, the photosensor configured to receive illumination from the fault status indicator.

19. A handheld user command tool adapted to optically coupled with a display, the handheld user tool comprising:
   a housing having a first end adapted for optical coupling with the display, the display comprising;
   coupling with a faulted circuit indicator associated with an electrical conductor of a power system; and,
   a first light emitting diode;
   a second light emitting diode disposed at the first end of the housing;
   an on/off selector disposed on an outside portion of the housing;
   a power supply operatively coupled to the second light emitting diode; and
   a microcontroller operatively coupled to the power supply, the second light emitting diode and the on/off selector, the microcontroller causing the second light emitting diode to generate an optical serial communication when an indication to enable transmission of the optical serial communication is received from the on/off selector,
   wherein the optical serial communication provides data for operation of the faulted circuit indicator.

20. The handheld user command tool of claim 19, wherein the housing comprises a cylinder, and wherein a concave area is formed in the first end to enable the optical coupling with the display.

21. The handheld user command tool of claim 19, wherein the on/off selector comprises a binary switch disposed on an outside portion of the handheld user command tool, a first position of the binary switch enabling transmission of the optical serial communication and a second position of the binary switch preventing transmission of the optical serial communication.

22. The handheld user command tool of claim 19, wherein the handheld user command tool further comprises a connector, the connector enabling communication between an intelligent computing device and the microcontroller.

23. The handheld user command tool of claim 22, wherein the connector is selected from the group consisting of a serial port, a parallel port and a universal serial bus connector.

24. The handheld user command tool of claim 19, wherein the handheld user command tool further comprises a transceiver assembly operatively coupled to the microcontroller, the transceiver assembly enabling radio frequency communication between a radio frequency intelligent computing device and the microcontroller.

25. The handheld user command tool of claim 19, wherein the handheld user command tool further comprises a photosensor disposed at the first end of the handheld user command tool and operatively coupled to the microcontroller, the photosensor configured to receive illumination from the first light emitting diode of the remote display.

26. The handheld user command tool of claim 19, wherein the display is integral to the faulted circuit indicator.

27. The handheld user command tool of claim 20, wherein the display is remote from the faulted circuit indicator.

28. The handheld user command tool of claim 27, wherein the display comprises mounted to a manhole cover.

29. The handheld user command tool of claim 28, wherein the manhole cover comprises a lens, and the display further comprises mounted to the lens of the manhole cover.

30. A method for communicating with a faulted circuit indicator, the method comprising:
   coupling a handheld user command tool with a display of a faulted circuit indicator;
   initiating optical serial communication including a command for operation of the faulted circuit indicator;
   detecting receipt of the optical serial communication using a display operatively coupled to the faulted circuit indicator;
   validating a serial digital signal, the serial digital signal formed by digitizing the optical serial communication; and
   executing the command.

31. The method of claim 30, wherein the step of initiating comprises:
   selecting an "on" position on an on/off selector of the handheld user command tool; and
   causing a light emitting diode of the handheld user command tool to generate the optical serial communication.

* * * * *